March 15, 1938.  W. R. JOHNSON  2,111,322
VALVE
Filed Oct. 12, 1935  3 Sheets-Sheet 2

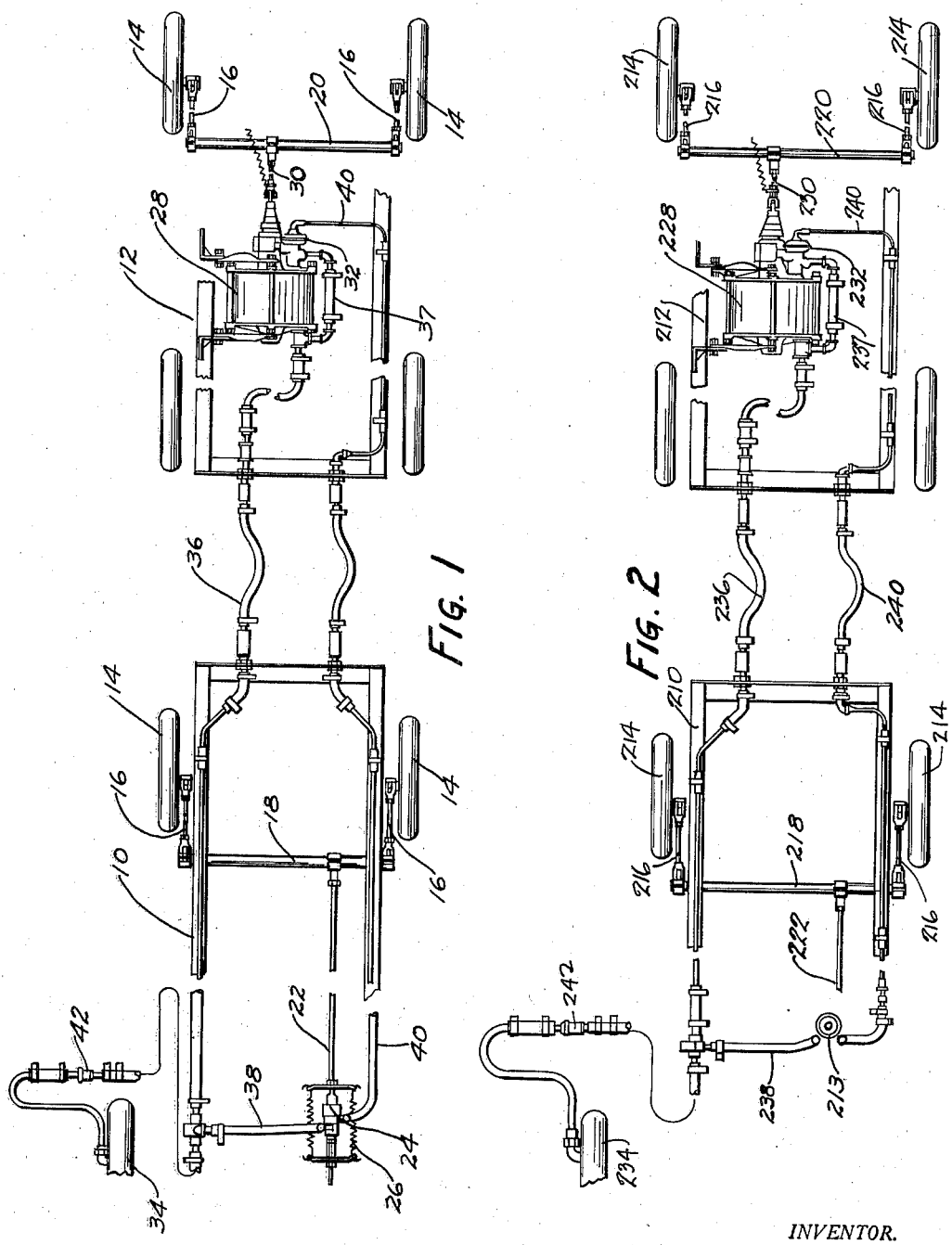

INVENTOR.
WAYNE R. JOHNSON
BY Jerome R. Cox
ATTORNEY.

March 15, 1938. W. R. JOHNSON 2,111,322
VALVE
Filed Oct. 12, 1935 3 Sheets-Sheet 3

INVENTOR.
WAYNE R. JOHNSON
BY Jerome R. Cox
ATTORNEY.

Patented Mar. 15, 1938

2,111,322

UNITED STATES PATENT OFFICE 2,111,322

VALVE

Wayne R. Johnson, Bell, Calif., assignor to Bendix Products Corporation, South Bend, Ind., a corporation of Indiana Application October 12, 1935, Serial No. 44,667

15 Claims. (Cl. 303—54)

This invention relates to a valve and particularly to a valve especially useful in controlling power brakes. Two types of valves are shown illustrating my invention and also several hook ups showing various uses of the valve.

One of the objects of the invention is the provision of a brake valve which is quicker in action than previously used valves. It is also more positive and is less subject to difficulties on account of dirt and so forth.

Further objects and features of the invention will be apparent after a reading of the subjoined specification and claims and after a consideration of the accompanying drawings in which:

Figure 1 is a largely diagrammatic plan view showing a brake arrangement for a tractor and a trailer in which the tractor brakes are applied mechanically and in which the trailer brakes are applied by vacuum power which is controlled by the mechanical actuation of the tractor brakes;

Figure 2 is a view similar to Figure 1 showing an arrangement in which the power application of the trailer brakes is entirely independent of the mechanical actuation of the tractor brakes;

Figure 3:
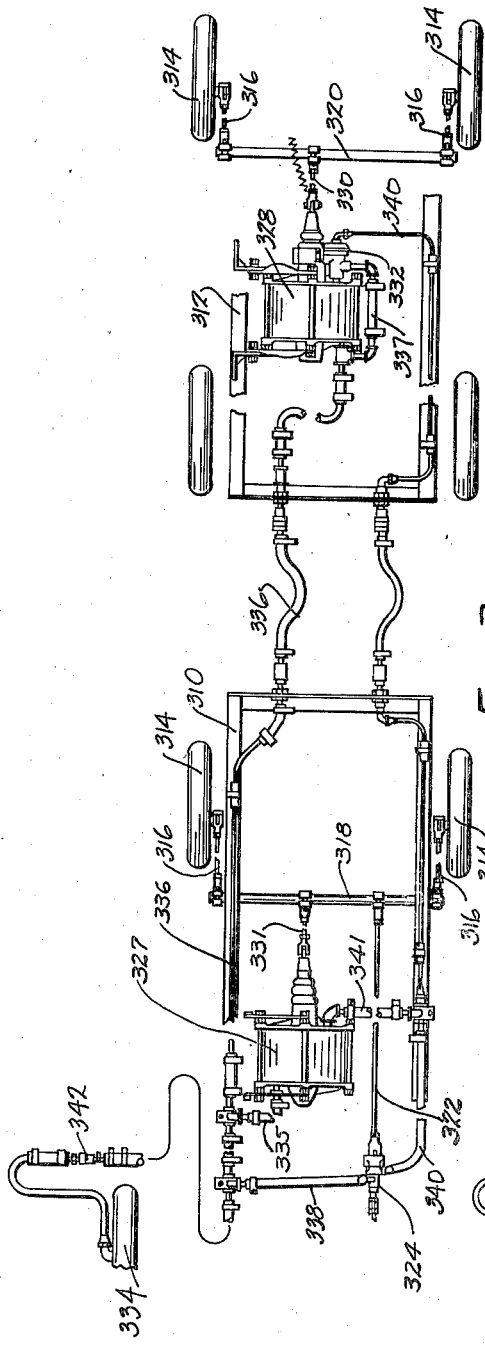
Figure 3 is a view similar to Figures 1 and 2 showing an arrangement in which both the trailer and the tractor brakes are applied by vacuum power and in which the two systems are dependent.

Referring in detail to the drawings there is shown in Figure 1 a tractor 10, a trailer 12, each provided with road wheels 14 equipped with brakes. The brakes of both vehicles are arranged to be operated by tension connections 16 each of which is connected to one of the cross shafts 18 and 20. The cross shaft 18 on the tractor is arranged to be operated by means of a pedal rod 22 which is connected to a pedal (not shown). Thus the pedal may operate the tractor brakes directly. Interposed in the rod 22 is a brake valve 24 mounted in straddle springs 26. The trailer brakes are operated by means of a power cylinder 28 secured to the frame of the trailer and arranged to operate the cross shaft 20 by means of a piston rod 30 connected at one end to the piston of the cylinder 28 and at the other end to an arm on the cross shaft 20.

Power cylinder 28 is operated through differentials in pressure between the pressure existing in the atmosphere and that existing in the manifold. It is controlled by the pedal valve 24 and the relay valve 32. The relay valve 32 is shown in detail in Figure 5 and will be subsequently described. Suitable conduits connect the intake manifold 34 with the forward end of the power cylinder 28 and constitutes a vacuum line designated 36. This vacuum line 36 is connected by a branch conduit 38 with control valve 24 and control valve 24 is connected by a conduit 40 with relay valve 32. The conduit 40 may be designated as the air line for convenience, because at other times it is filled with air though at other times it is evacuated to the same degree of vacuum as the intake manifold. Preferably a check valve 42 is inserted in the line 36 adjacent to the intake manifold 34.

Figure 5:
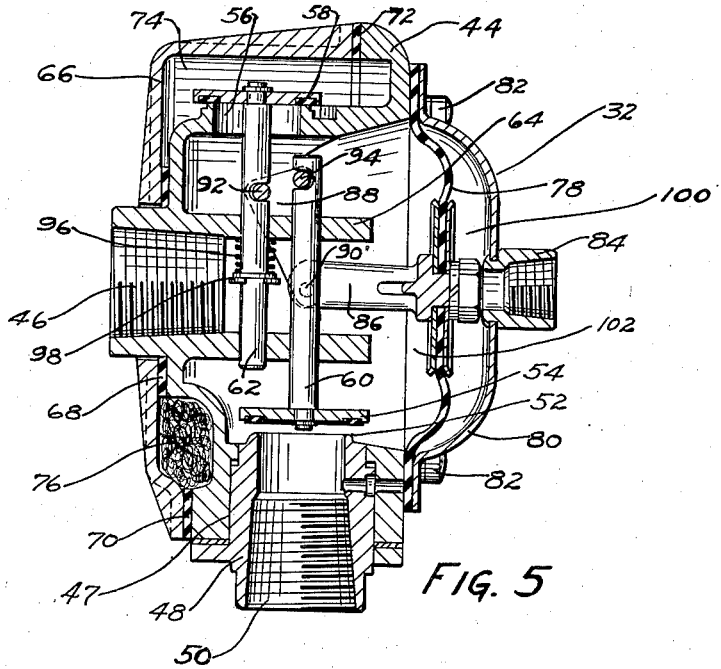
Figure 5 is a detailed view in section of a relay valve embodying my invention being one of the valves used in the hook ups shown in Figures 1-4.

The relay valve 32 is shown more in detail in Figure 5. It comprises the main casing 44 formed at one end (called the forward end for convenience) with a threaded opening 46 which is connected to the rearward end of the cylinder 28. The casing 44 is also formed with an opening 47 into which a plug 48 is inserted and secured, plug 48 having a threaded opening 50 into which the conduit 37 is secured. The inner end of the plug 50 is formed with a valve seat 52 onto which a poppet valve 54 is arranged at times to seat. The casing 44 is also formed with an opening 56, formed with a valve seat onto which a poppet valve 58 normally seats. The valves 54 and 58 are provided with stems 60 and 62 respectively. The casing 44 is formed with an annular inward extension aligned with the opening 46 the extension being provided with aligned openings through which the stems 60 and 62 are adapted to slide. A forward cover 66 is provided for the casing 44 and this cover 66 is sealed to the casing by means of packings such as 68, 70 and 72. It cooperates with the casing 44 to form an air inlet chamber 74 which communicates with the atmosphere through the air strainer 76. The air chamber 74 is arranged at times to communicate with the interior of the casing 44 through opening 56 but normally the poppet valve 58 closes this opening so that atmosphere is cut off from the interior of the casing 44. Normally the poppet valve 54 is held off its seat so that the connection from the intake manifold 34 through the vacuum line 36 and the conduit 37 maintains the interior of the casing 44 under equal pressure with that of the intake manifold, that is to say under a substantial amount of vacuum.

Means are provided for maintaining the poppet valves 54 and 58 in the normal position shown in Figure 5 and for at times moving said valve from said position. The rearward end of the casing 44 is closed by a diaphragm 78 and a cap 80, the former being clamped between the cap and the casing and the latter being held on the casing by means of screws 82. The cap 80 is provided with a nipple 84 having a screw threaded opening connected to the conduit 40. The diaphragm 78 is pivotally connected by a link 86 with a triangular plate 88 by means of a pin 90. The triangular plate 88 is provided with pins 92 and 94 which extend through slots in the stems 60 and 62. The plate 88 is thus in effect a bell crank lever connected to the stems 60 and 62 and the diaphragm 78. The stem 62 is provided with a spring 96 interposed between a shoulder 98 and a portion of the annular extension 64. The spring 96 tends to hold the valve 58 upon its seat. At the same time it causes the pin 92 to form a resilient fulcrum for the plate 88 so that the resiliency of the diaphragm 78 in its outward position as shown normally holds the valve 54 off of its seat. The chamber formed by the outer side of the diaphragm 78 is designated as 100 and the chamber formed in the casing 44 inward of the diaphragm 78 is designated as 102. Variations in pressure between these chambers control the diaphragm and movement of diaphragm 78 inward causes a resulting movement of the pivot point 90 and tends to lift the stem 62 and to lower the pivotal connection 94 thus closing the valve 54 and subsequently opening valve 56. Inasmuch as the chamber 74 is connected to the atmosphere this allows atmospheric pressure to enter the chamber 102 and through the opening 46 to enter the rearward end of the power cylinder.

Inasmuch as the diaphragm 78 is balanced between the pressure existing in 100 and 102 the introduction of air in 102 tends to reverse the valves again and the exact amount of air introduced into 102 is controlled by the amount of air the operator introduces into the chamber 100.

The reason for the straddle springs 26 is as follows: On some types of vacuum brake power installation (particularly tractor-trailer combinations) where the trailer only is equipped with power brakes, it is essential to have some means whereby the manually operated brakes on the tractor may be synchronized with the power brakes on the trailer. This type of installation usually consists of a brake valve mounted on the foot brake pedal rod controlling the power cylinder of the trailer. To overcome the possibility of the trailer brake taking hold too quickly and thereby doing most of the braking before the manually operated tractor brakes are allowed to do their share, it is necessary to install a set of straddle springs as shown. By adjusting the tension of the spring it is possible to synchronize the pressure required to open the brake valve to that required to apply the tractor brakes. If the trailer brakes operate too much ahead of those on the tractor, the tension on the springs may be increased by means of an adjusting nut. Increasing the tension of springs allows the tractor brakes to operate earlier, decreasing the spring tension allows the trailer brakes to operate ahead of the tractor brakes. Once properly adjusted, synchronization will be correctly maintained.

It is believed that the operation of this hookup and valve will be apparent from the above description. Whenever the operator applies the brakes manually through the connection 22 it causes operation of the valve 24. As previously explained the straddle spring 26 synchronizes the operation of the valve 24 with the operation of the mechanical brakes. Operation of the valve 24 cuts off the connection between the conduit 38 and the conduit 40 and thus cuts off the vacuum which is normally in the line 40 and introduces atmospheric air which thus enters the chamber 100. This moves the diaphragm 78 forward thus closing the valve 54 and opening the valve 58. The closing of the valve 54 shuts off the vacuum which is normally present in the chamber 102 through its connections through the opening 50, the conduit 37 and the vacuum line 36 and allows atmospheric air to flow in from the chamber 74 into the chamber 102 and thus through the opening 46 to the rearward end of the power cylinder 28. Inasmuch as the forward end of the power cylinder 28 is always connected through the vacuum line 36 with the intake manifold 34 there is always vacuum in the front part of said cylinder. The differential in pressure between the vacuum pressure at the front end, and the atmospheric pressure at the rear end causes movement of the power cylinder which pulls on the connection 30 and thus applies the brakes on the trailer wheels. Similarly release of the brakes on the tractor wheels relieves the tension on the connection 22 and thus opens the valve 24 so that the manifold is again connected through the conduit 40 with the chamber 100 and the pressures in the chamber 100 and 102 becoming equalized, the spring 96 opens the valve 54 and closes the valve 58. Thereupon the chamber 102 is connected to the manifold through the conduit 37 and the vacuum line 36 and thus the rearward end of the power cylinder 28 is evacuated. The opposite side of the power piston then having equal pressure the return springs relieve the brakes on trailer wheels.

Figure 6:
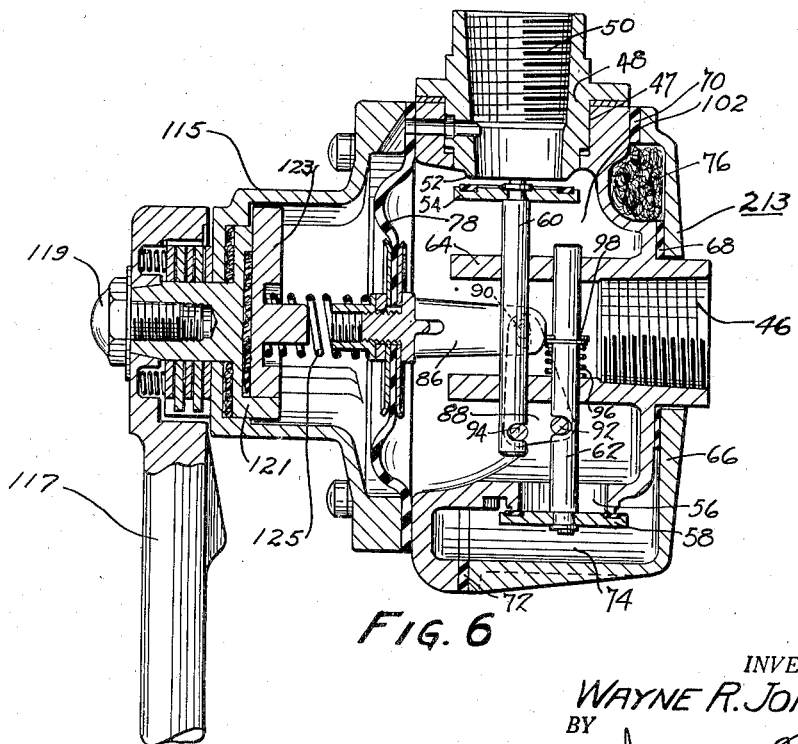
Figure 6 is a detailed view in section of hand control valve embodying my invention being the hand controlled valve shown in Figures 2 and 4.

In the showing of Figure 2 like parts have been designated by the same numerals with the addition of 200 and a repetition of the description is believed to be unnecessary. However the cross shaft 218 is connected directly to the pedal through a link 222 in which there is interposed no valve corresponding to the valve 24. In place of the valve 24 there is provided between the conduit 238 and the conduit 240 a hand control 213 which is shown more in detail in Figure 6.

The hand controlled valve 213 is to a large extent the same as the relay valve 32 and like parts are designated by the same numerals, repetition of the description being believed unnecessary. Instead of the cap 80 there is provided a cover 115 the outer end of which is provided with a handle 117 for controlling the valve. Connected to this handle 117 by means of a nut 119 is a cam 121 arranged to act upon a disc 123 to move the disc 123 inward thus compressing a spring 125 interposed between the diaphragm 78 and the disc 123. A passage formed in the plug 48, the casing 44, the diaphragm 78, and the cover 115 provides a communication between the inlet passage 50 and the chamber between the cover 115 and the diaphragm. Thus the diaphragm 78 is balanced between the pressure existing in the chamber 102 and the spring 125. The pressure of the spring depends upon the amount of rotation of the handle 117. The actual pressure in the chamber 102 can thus be accurately controlled by the position of the handle 117. Similarly pressure in the chamber 102 of the hand control valve is transmitted from the opening 46 through the conduit 240 to the relay valve 232 and controls the pressure in the chamber 100 thereof. Inasmuch as the diaphragm 78 of the relay valve is balanced between the pressure in the chamber 100 and that in the chamber 102, the pressure in the chamber 102 of the relay valve is also accurately controlled so that the pressure applying the brake through the vacuum cylinder 228 is accurately controlled by the hand control handle 117.

Similarly in Figure 3 like parts are designated by the same reference numerals with the addition of 300 and parts previously described will not again be described. As may be seen the valve 324 controls not only the relay valve 332, but also through a branch conduit 341 controls the power cylinder 327 which has its piston connected through the link 331 to the cross shaft 318. The vacuum line 336 is connected by a branch conduit 335 with the forward end of the power cylinder 327. Thus both the tractor and the trailer brakes are applied by vacuum power, though in case of a failure of the vacuum power the tractor brake can be applied manually through the link 322.

Figure 4:
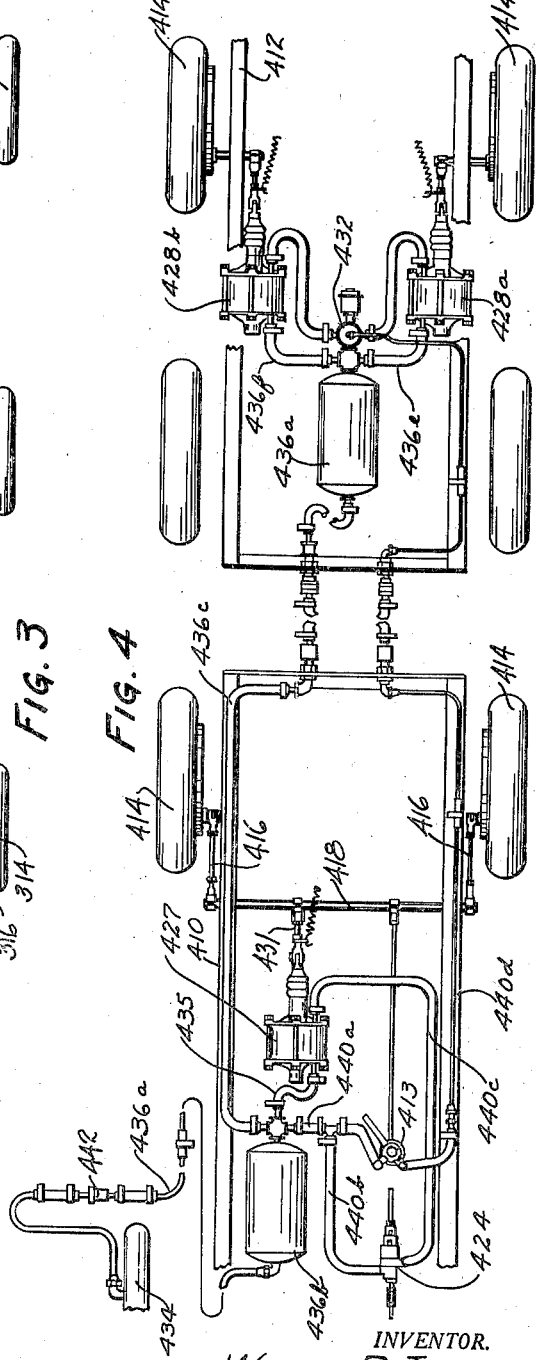
Figure 4 is a view similar to Figures 1, 2 and 3 showing an arrangement in which both the tractor and the trailer brakes are applied by vacuum power but in which the control of the trailer brakes is separate and independent of the control of the tractor brakes.

Also in the arrangement shown in Figure 4 the same parts as are designated by the same numerals with the addition of 400. Therein the manifold 434 is connected by a conduit 436(a) with a tractor vacuum tank 436(b) which is connected through a vacuum line 436(c) with a trailer vacuum tank 436(d). A conduit 440(a) is connected by a branch conduit 440(b) with a pedal controlled valve 424 and is also connected with a hand control valve 413. The pedal controlled valve 424 is connected by a conduit 440(c) with the rearward end of power cylinder 427 and the forward end of said cylinder 427 is connected by a branch conduit 435 with conduit 440 and with vacuum tank 436(b). The hand control valve 413 is connected by a conduit 440(d) with relay valve 432. The relay valve is connected to the rearward end of power cylinders 428(a) and 428(b) which are each connected with a separate brake for each of the rear wheels of the trailer. The trailer vacuum tank 436(d) is connected by branch conduits 436(e) and 436(f) with the forward ends of power cylinders 428(a) and 428(b) respectively.

The operation of the arrangements shown in Figures 2, 3 and 4 is similar to that described above in connection with Figure 1 and it is believed that a separate description of the operation of these arrangements need not be made.

It is to be understood that the above described embodiments of my invention are for the purpose of illustration only and various changes may be made therein without departing from the spirit and scope of the invention.

I claim:

1. In a control valve for automotive brakes, a casing having a pair of valve seats arranged on opposite sides of the casing, a pair of poppet valves for coaction with said seats, oppositely-directed stems on the valves extending across the casing in parallel relation with each other, a floating lever connected to the stems and means for operating said lever for first closing one valve and then opening the other.

2. The structure claimed in claim 1 further characterized in that the means for controlling said lever includes a diaphragm and that when one valve is opened it admits air under a relatively high pressure while when the other valve is opened it connects the casing with a source of relatively low air pressure.

3. The structure described in claim 1 further characterized in that the means for controlling said lever includes a hand control and that when one valve is opened it admits air under a relatively high pressure while when the other valve is opened it connects the casing with a source of relatively low air pressure.

4. The structure described in claim 1 further characterized in that the means for controlling said lever includes a hand control element and a diaphragm and that when one valve is opened it admits air under a relatively high pressure while when the other valve is opened it connects the casing with a source of relatively low air pressure.

5. The structure described in claim 1 further characterized in that the means for controlling said lever includes a diaphragm, a hand control element, and a spring interposed between said diaphragm and said hand control element and that when one valve is opened it admits air under a relatively high pressure while when the other valve is opened it connects the casing with a source of relatively low air pressure.

6. The structure described in claim 1 further characterized in that the means for controlling said lever includes a diaphragm exposed to the existing pressure in said casing, and means for conducting air under pressure to the opposite side of said diaphragm.

7. The structure described in claim 1 further characterized in that the means for controlling said lever includes a diaphragm exposed to the existing pressure in said casing, and also exposed to a varying air pressure under the control of the operator.

8. The structure described in claim 1 further characterized in that the casing is provided with an outlet opening having an inwardly extending annular flange formed with two pairs of aligned openings through which said stems extend.

9. A valve comprising a casing having a pair of valve seats, a pair of poppet valves for coaction with said seats, a pair of stems each formed with a slot and each connected to one of said valves, a floating lever comprising a triangular plate provided with three pins, one adjacent each of the corners thereof, two of said pins extending through said slots in the valve stems, and means comprising a link pivotally connected to the other pin for operating said lever, said lever being only connected to said stems and said means.

10. A valve comprising a casing having a pair of valve seats out of alignment with each other, a pair of poppet valves for coaction with said seats, a pair of stems also out of alignment with each other and each formed with a slot and each connected to one of said valves, a floating lever comprising a triangular plate provided with three pins, one adjacent each of the corners thereof, two of said pins extending through said slots in the valve stems, and means comprising a link pivotally connected to the other pin for operating said lever.

11. A valve comprising a casing having a pair of valve seats, a pair of poppet valves for coaction with said seats each provided with a stem extending inwardly from said valve so as to be arranged parallel to each other and each formed with a slot, a floating lever comprising a triangular plate provided with three pins, one adjacent each of the corners thereof, two of said pins extending through said slots in the valve stems, and means comprising a link pivotally connected to the other pin for operating said lever.

12. In a control valve for automotive brakes, a casing having a pair of valve seats arranged on opposite sides of the casing, a pair of poppet valves for coaction with said seats, oppositely-directed stems on the valves extending across the casing in parallel relation with each other, a floating lever connected to the stems and means for operating said lever for first closing one valve and then opening the other, the stems of the valves being positioned so closely that the valves are in substantial overlapping position.

13. In a control valve for automotive braking systems employing high and low pressures, a casing, a valve seat on the outside of said casing surrounding a port having a connection with a source of the high pressure, a valve on said seat opening outwardly toward said high pressure, a valve seat on the inside of said casing surrounding a part communicating with a source of said low pressure, a valve on said seat closing toward said low pressure, a floating lever connected to the valves, and means for operating the lever to first close one valve and then open the other.

14. In a control valve for automotive braking systems employing high and low pressures, a casing, a diaphragm dividing the casing into two parts, a pair of valve seats in one part of said casing surrounding ports, one of which communicates with a source of the high pressure and one of which communicates with a source of the low pressure, valves in said ports, a floating lever connected to said valves, means connecting the floating lever to the diaphragm, a spring in the other part of said casing bearing on said diaphragm, and manual means for varying the pressure of said spring, said other part of the casing being sealed against air leakage and having a passage extending to and communicating with the source of low pressure.

15. In a relay valve for automotive brakes, a casing, a diaphragm dividing the casing into two chambers, one of said chambers being formed with a port and having a controlled pressure communicating therewith through said port and the other chamber being formed with three ports one of which transmits a controlled pressure to the brake, and the other two of which are connected respectively to sources of high and low pressure, poppet valves in the last-named two ports, a floating lever connected to the poppet valves, and operable to first close one and open the other, and means connecting the diaphragm to the floating lever to operate the same.

WAYNE R. JOHNSON.